United States Patent Office 2,851,289
Patented Sept. 9, 1958

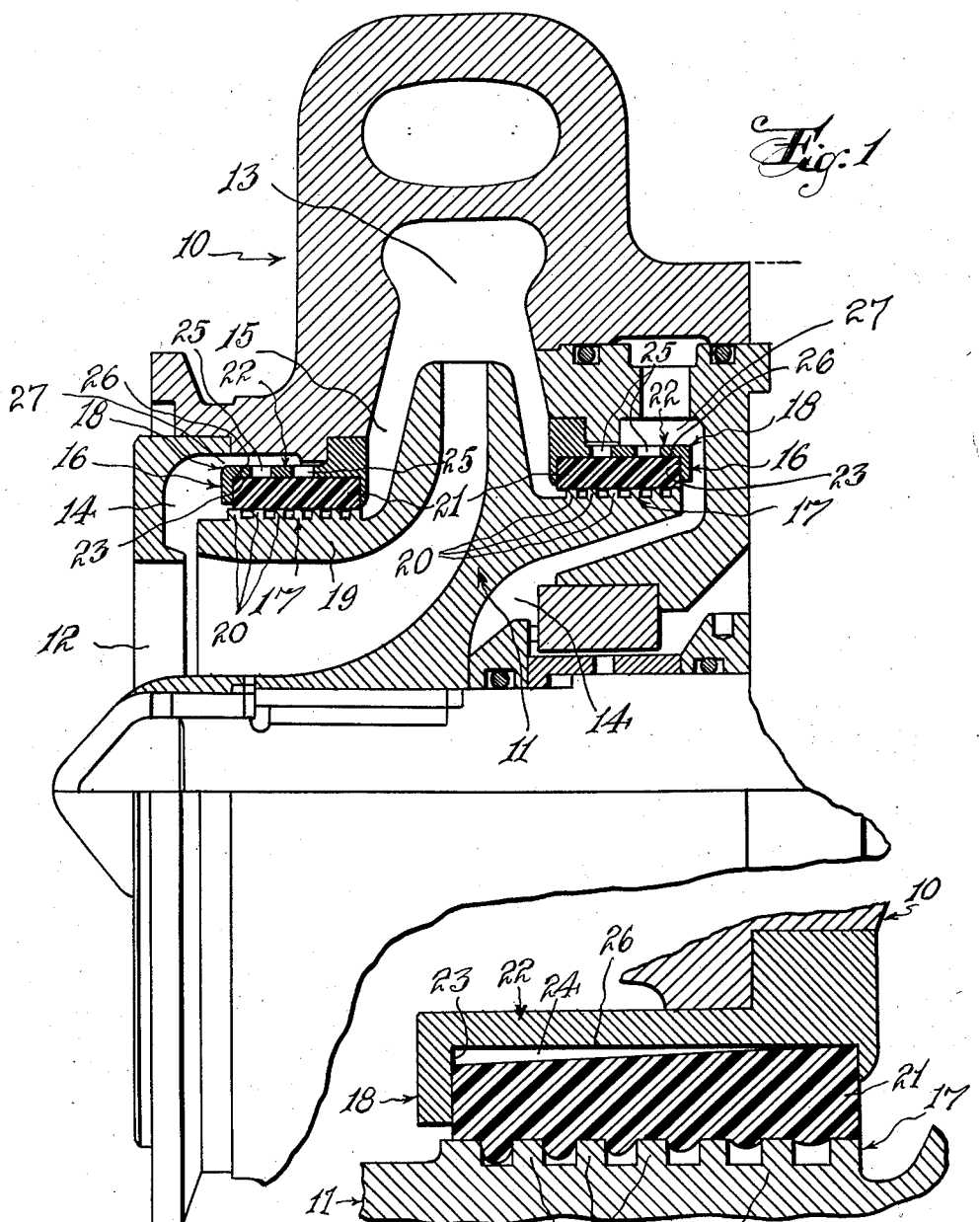

2,851,289

RECIRCULATION SEAL WITH PLASTIC WEAR RING FOR HYDRAULIC APPARATUS

Haakon O. Pedersen, Morris Plains, N. J., assignor, by mesne assignments, to Thiokol Chemical Corporation, a corporation of Delaware Application March 22, 1957, Serial No. 647,839

4 Claims. (Cl. 286—7)

The invention relates in general to recirculation sealing means for hydraulic apparatus such as centrifugal pumps and turbines, and has particular reference to the type of fluid seal that comprises a complementary pair of frictionally opposed elements, one of which is affixed to the stationary part of the apparatus such as the casing of a pump and the other is carried by the rotating part such as the pump impeller, and wherein one of the seal elements has plural coaxial serrations facing the other element, which latter is a replaceable wear ring arranged to bear against the serrations of the former element.

In the construction of sealing means of the type just described, the serrated seal element may be made integral with either of the relatively rotatable parts of the hydraulic apparatus, but the replaceable wear ring must be mounted in a holder wherein clearance space between the latter and the surface of the wear ring opposite to the serrated element, although kept to minimum tolerance, is unavoidable. As a result of this unavoidable clearance space in back of the wear ring, pressure from the downstream side of the hydraulic apparatus in the case of a pump will force fluid in a recirculatory direction into the said space. The penetrating fluid will tend to press the wear ring radially inward toward the serrated seal element, but, when the wear ring is made of comparatively inflexible metal, any such pressure will be resisted and only normal wear of said ring can result.

The desirability of using plastic material in the construction of wear rings for the sealing means of hydraulic apparatus has long been recognized, but, prior to my present invention, it has been impracticable to employ plastic rings because of their flexibility as compared to metallic rings. It was found that the fluid pressure exerted on the outer periphery of such a wear ring through the clearance space caused it to be pressed radially inward against the serrations of the complementary seal element in such a manner that excessive wear on the plastic ring and even plastic flow, or extrusion, of the plastic material into the grooves between serrations, due to deformation beyond its elastic limit, occurred. Moreover, due to the pressure differential at opposite axial sides of the wear ring, there was a tipping tendency that produced greater wear and plastic flow in the direction of the low pressure side of the ring, which was especially objectionable.

The use of plastic wear rings is especially desirable under some circumstances. For instance, plastic rings will not seize as readily as metallic rings and will better tolerate small metallic impurities in the fluid without seizure. Then, too, in a centrifugal pump for use in pumping acids, the exposed metallic parts will be corrosively attacked. For any particular acid to be pumped, there usually is a specific plastic material that will not be corroded by it, so it is highly desirable for this reason at least that the wear rings for such an apparatus be made of the appropriate plastic material.

It, therefore, has been my primary object to provide means for effecting an efficient sealing contact between a plastic wear ring and the serrations of the complementary seal element without causing plastic flow or extrusion. In the course of experimentation toward that end, it was discovered that the previously encountered radially inward pressure on the plastic wear ring could be relieved by venting the clearance space between the wear ring and its holder through radial apertures into the low pressure region of the apparatus. As a result, the wear ring was maintained by suction in firm contact with the back wall of the holder, so as to be sustained in proper wearing contact with the serrations of the other seal element instead of being subjected to deformation beyond the elastic limit of the material of which the wear ring is composed.

Other objects, advantages and features of the invention will become apparent as the following specific description is read in connection with the accompanying drawing, in which:

Fig. 1 is a fragmentary axial section of part of a centrifugal pump to show a pair of plastic wear rings employed therein as cooperative elements of sealing means to reduce fluid recirculation to a minimum; and Fig. 2 is a similar sectional view, on an enlarged scale, of a plastic wear ring when being used in the prior art manner, showing the result of material flow.

Referring now in detail to the drawing, wherein like reference characters designate corresponding parts in the several views, Fig. 1 discloses by way of illustration a centrifugal pump having plastic wear rings installed therein as elements of recirculation sealing means for the principal relatively movable component parts thereof, which are the stationary casing 10 and rotatable impeller 11. In a pump of this type, impeller 11 draws water or other fluid in through centrally located inlet port 12 by the application of centrifugal force and expels it through outlet port 13 located in the outer periphery of casing 10. Surrounding the intake end of impeller 11 and in communciation with inlet port 12, there is a cavity or low pressure region 14 in casing 10. It will be understood that, if the sealing means installation were in a turbine instead of a centrifugal pump, with a vaned runner substituted for impeller 11, the low pressure region would be similarly located in relation to the rotatable component and the sealing means. There is also a high pressure region 15 at the outlet side of impeller 11.

At each end of impeller 11 with reference to its rotational axis, recirculation sealing means 16 is customarily installed. This sealing means 16 includes complementary first and second seal elements 17 and 18, respectively.

First seal element 17 is constituted by an integral portion 19 of impeller 11 that is provided with plural coaxial peripheral serrations 20. Customarily, the impeller of a centrifugal pump and its casing are made of metal, so serrations 20 of first seal element 17 will be metallic in composition and therefore very hard and less subject to wear than plastic material.

Complementary second seal element 18 comprises a wear ring 21 of rectangular axial cross-section arranged outwardly concentric to first seal element 17 with its inner peripheral face in rubbing contact with serrations 20 thereof, and an annular holder 22 stationarily mounted in casing 10. Wear ring 21 fits within the inwardly opening annular cavity 23 of similar rectangular cross-section in holder 22. In accordance with the present invention, wear ring 21 is composed of plastic material suited to the intended use.

It is the clearance space 24 at the bottom of cavity 23 in holder 22 that has been penetrated by hydraulic fluid under the influence of high pressure region 15 in the prior art holder structures in a manner which presses plastic wear ring 21 against serrations 20 with such force that the said wear ring becomes deformed beyond the elastic limit of the plastic material and results in permanent material flow into the grooves between serrations. Fig. 2 represents the prior art holder structure and resulting plastic flow. It will be observed that, in addition to radially inward pressure on wear ring 21, there is axial tipping of said ring in the direction of the low pressure side of impeller 11. This is because there is no means to relieve the pressure in back of wear ring 21.

In Fig. 1, such pressure relieving means, which is the novel feature of my present invention, is shown. Plural through apertures 25 are provided in the axial back wall of holder 22. These apertures communicate with low pressure region 14 through an encompassing annular channel 27 and are arranged in axially separated circumferential rows to balance the effect of suction on wear ring 21. This balanced suction pulls wear ring 21 radially outward and maintains it in firm contact with back wall 26 of holder 22 so that said wear ring will rub against serrations 20 of first seal element 17 with normal pressure, such as will not result in plastic flow.

Another novel feature is the provision of a more inwardly extensive lip at the high pressure side of holder 22 to shield wear ring 21 more effectively against axial inward pressure on its exposed side, or end, face. This feature does not appear in the prior art structure illustrated in Fig. 2.

While there have been shown and described and pointed out the fundamental novel features of this invention as applied to a single structural embodiment, it will be understood that various omissions and substitutions and changes in the form and details of the device illustrated may be made by those skilled in the art without departing from the spirit of the invention. It is the intention, therefore, to be limited only as indicated by the scope of the following claims.

I claim:

1. A fluid sealing means for hydraulic apparatus such as centrifugal pumps and turbines that include a stationary casing component and a rotatable impeller, and wherein said casing component has low pressure and high pressure regions at opposite sides of said impeller, which fluid sealing means comprises in combination: a first seal element having plural annular serrations provided on one of said components in coaxial relation to the rotational axis of the impeller; a second seal element comprising a holder mounted on the other of said components and having an annular cavity openly presented toward said annular serrations in coaxial relation thereto, and a plastic wear ring fitted in the holder cavity with minimum practicable clearance and with its exposed face in rubbing contact with the annular serrations of the first seal element; and means to establish communication between the clearance space at the bottom of said holder cavity and the low pressure region of the casing, whereby the face of the wear ring opposite to its exposed face is subjected to suction to prevent excessive pressure of said wear ring against the serrations of the first seal element.

2. A fluid sealing means as defined in claim 1, wherein the holder for the wear ring of the second seal element includes an inner wall provided with plural through vent apertures in communication with the low pressure region of the casing.

3. A fluid sealing means as defined in claim 2, wherein the vent apertures are distributed uniformly throughout the circumferential and axial extent of the clearance space at the bottom of the holder cavity to cause balanced application of suction to the wear ring.

4. A fluid sealing means as defined in claim 1, wherein the holder of the second seal element has side lips of an extent substantially equal to the radial thickness of the wear ring in order to sustain the latter uniformly against side pressure.

References Cited in the file of this patent

UNITED STATES PATENTS

| | | |
|---|---|---|
| 1,525,884 | Plummer | Feb. 10, 1925 |
| 1,667,992 | Sherwood et al. | May 1, 1928 |
| 2,732,232 | Whitfield | Jan. 24, 1956 |